United States Patent
Li et al.

(10) Patent No.: US 11,750,082 B2
(45) Date of Patent: Sep. 5, 2023

(54) POWER DEVICE WITH PROTECTION CIRCUIT

(71) Applicant: Delta Electronics (Shanghai) Co., Ltd., Shanghai (CN)

(72) Inventors: Zhenfu Li, Shanghai (CN); Changhe Wang, Shanghai (CN); Lixiang Wang, Shanghai (CN); Youzhun Cai, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 350 days.

(21) Appl. No.: 17/212,929

(22) Filed: Mar. 25, 2021

(65) Prior Publication Data

US 2021/0305891 A1    Sep. 30, 2021

(30) Foreign Application Priority Data

Mar. 30, 2020 (CN) .......................... 202010235175.6

(51) Int. Cl.
*H02M 1/32* (2007.01)
*H02M 3/335* (2006.01)

(52) U.S. Cl.
CPC ............ *H02M 1/32* (2013.01); *H02M 3/335* (2013.01)

(58) Field of Classification Search
CPC .......... H02M 1/32; H02M 3/335; H02M 1/36; H02M 1/007
See application file for complete search history.

(56) References Cited

U.S. PATENT DOCUMENTS

| | | | |
|---|---|---|---|
| 5,945,802 A * | 8/1999 | Konrad | H02P 23/0077 318/807 |
| 7,965,484 B2 | 6/2011 | Baudesson et al. | |
| 9,466,973 B2 | 10/2016 | Jang et al. | |
| 2019/0140536 A1* | 5/2019 | Ikeda | H02M 1/32 |
| 2021/0126552 A1* | 4/2021 | Ikeda | G01R 19/0053 |

FOREIGN PATENT DOCUMENTS

| | | |
|---|---|---|
| CN | 101515758 B | 12/2012 |
| CN | 102163872 B | 2/2013 |
| CN | 108900078 A | 11/2018 |
| CN | 106410955 B | 3/2019 |
| CN | 106374733 B | 4/2019 |
| CN | 110784101 A | 2/2020 |
| WO | 2006026549 A2 | 3/2006 |

* cited by examiner

*Primary Examiner* — Adolf D Berhane
*Assistant Examiner* — Afework S Demisse
(74) *Attorney, Agent, or Firm* — KIRTON McCONKIE; Evan R. Witt

(57) ABSTRACT

A power device with a protection circuit is provided. The power device includes a power module, a power output terminal, a converter module, a bus capacitor, and a protection circuit. The power module receives an input power. The converter module, the protection circuit, and the bus capacitor is electrically connected between the power module and the power output terminal. The protection circuit is configured for overvoltage protection when the input power being overvoltage, suppressing the surge current when booting up the power device, and regulating the voltage on the bus capacitor under overvoltage and undervoltage conditions.

20 Claims, 7 Drawing Sheets

POWER DEVICE WITH PROTECTION CIRCUIT

CROSS-REFERENCE TO RELATED APPLICATION

This application claims priority to China Patent Application No. 202010235175.6, filed on Mar. 30, 2020. The entire contents of the above-mentioned patent applications are incorporated herein by reference for all purposes.

FIELD OF THE INVENTION

The present disclosure relates to a power device with a protection circuit, and more particularly to a power device capable of realizing the overvoltage and overcurrent protection with fewer power components.

BACKGROUND OF THE INVENTION

According to the standard of IEC (international electrotechnical commission), there is a need of providing safety protection for voltage interference and electromagnetic interference in low-voltage power devices. In specific applications, it is required that the power device should be able to bear an abnormal voltage for a certain period of time without being damaged. Therefore, there is a need of disposing an additional protection circuit accordingly. The conventional protection circuit is mainly designed based on cutting off input voltage or building bus discharging branch circuit. However, the conventional protection circuit requires a lot of power components, which causes complicated wiring and high cost.

Therefore, there is a need of providing a protection circuit to obviate the drawbacks encountered from the prior arts.

SUMMARY OF THE INVENTION

It is an objective of the present disclosure to provide a power device with a protection circuit. Through integrating and multiplexing the power components, the power device realizes the overvoltage protection with fewer power components. Moreover, by the protection circuit, the surge current is suppressed when the power device is booted up, and the voltage regulation for the bus capacitor under overvoltage and undervoltage conditions is realized. Consequently, the wiring complexity and the cost of the power device are reduced, and the power density of the power device is increased.

In accordance with an aspect of the present disclosure, there is provided a power device with a protection circuit. The power device includes a power module, a power output terminal, a converter module, a bus capacitor, and a protection circuit. The power module is adapted to receive an input power and includes a first terminal and a second terminal. The converter module is electrically connected between the power module and the power output terminal. The bus capacitor is electrically connected between the second terminal of the power module and the power output terminal. The protection circuit includes a protection switch, a first diode, a second diode, a resistor, a third diode, and a switch transistor. The protection switch is electrically connected between the first terminal of the power module and the converter module. An anode of the first diode is electrically connected to the first terminal of the power module, and a cathode of the first diode is electrically connected to a cathode of the second diode and one terminal of the resistor. An anode of the second diode is electrically connected to a cathode of the third diode and the power output terminal. An anode of the third diode is electrically connected to the other terminal of the resistor and one terminal of the switch transistor, and the other terminal of the switch transistor is electrically connected to the second terminal of the power module.

In accordance with another aspect of the present disclosure, there is provided a power device with a protection circuit. The power device includes a power module, a power output terminal, a converter module, a bus capacitor, and a protection circuit. The power module is adapted to receive an input power and includes a first terminal and a second terminal. The converter module includes an inductor, a boost diode, and a switch transistor. A cathode of the boost diode is electrically connected to the power output terminal, and an anode of the boost diode is electrically connected to the inductor and one terminal of the switch transistor. The other terminal of the switch transistor is electrically connected to the second terminal of the power module. The bus capacitor is electrically connected between the second terminal of the power module and the power output terminal. The protection circuit includes a protection switch, a first diode, a second diode, and a resistor. The protection switch includes a common node, a first contact node, and a second contact node. An anode of the first diode is electrically connected to the first terminal of the power module and the first contact node of the protection switch. A cathode of the first diode is electrically connected to a cathode of the second diode and one terminal of the resistor. The other terminal of the resistor is electrically connected to the second contact node of the protection switch. The common node of the protection switch is electrically connected to the inductor of the converter module, and an anode of the second diode is electrically connected to the power output terminal.

In accordance with another aspect of the present disclosure, there is provided a power device with a protection circuit. The power device includes a power module, a power output terminal, a converter module, a bus capacitor, and a protection circuit. The power module is adapted to receive an input power and includes a first terminal and a second terminal. The converter module is electrically connected between the power module and the power output terminal. The bus capacitor is electrically connected between the second terminal of the power module and the power output terminal. The protection circuit includes a protection switch, a first diode, a first resistor, a second diode, a third diode, a second resistor, and a switch transistor. The protection switch is electrically connected between the first terminal of the power module and the converter module. An anode of the first diode is electrically connected to the first terminal of the power module, and a cathode of the first diode is electrically connected to one terminal of the first resistor. The other terminal of the first resistor is electrically connected to an anode of the second diode and an anode of the third diode. One terminal of the second resistor is electrically connected to a cathode of the second diode, and the other terminal of the second resistor is electrically connected to a cathode of the third diode and one terminal of the switch transistor. The other terminal of the switch transistor is electrically connected to the second terminal of the power module.

In accordance with another aspect of the present disclosure, there is provided a power device with a protection circuit. The power device includes a power module, a power output terminal, a converter module, a bus capacitor, and a protection circuit. The power module is adapted to receive an input power and includes a first terminal and a second terminal. The converter module is electrically connected between the power module and the power output terminal. The bus capacitor is electrically connected between the second terminal of the power module and the power output terminal. The protection circuit includes a protection switch, a first diode, a first resistor, a second resistor, and a switch transistor. The protection switch is electrically connected between the first terminal of the power module and the converter module. An anode of the first diode is electrically connected to the first terminal of the power module, and a cathode of the first diode is electrically connected to one terminal of the first resistor. The other terminal of the first resistor is electrically connected to one terminal of the second resistor and one terminal of the switch transistor. The other terminal of the second resistor is electrically connected to the power output terminal, and the other terminal of the switch transistor is electrically connected the second terminal of the power module.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
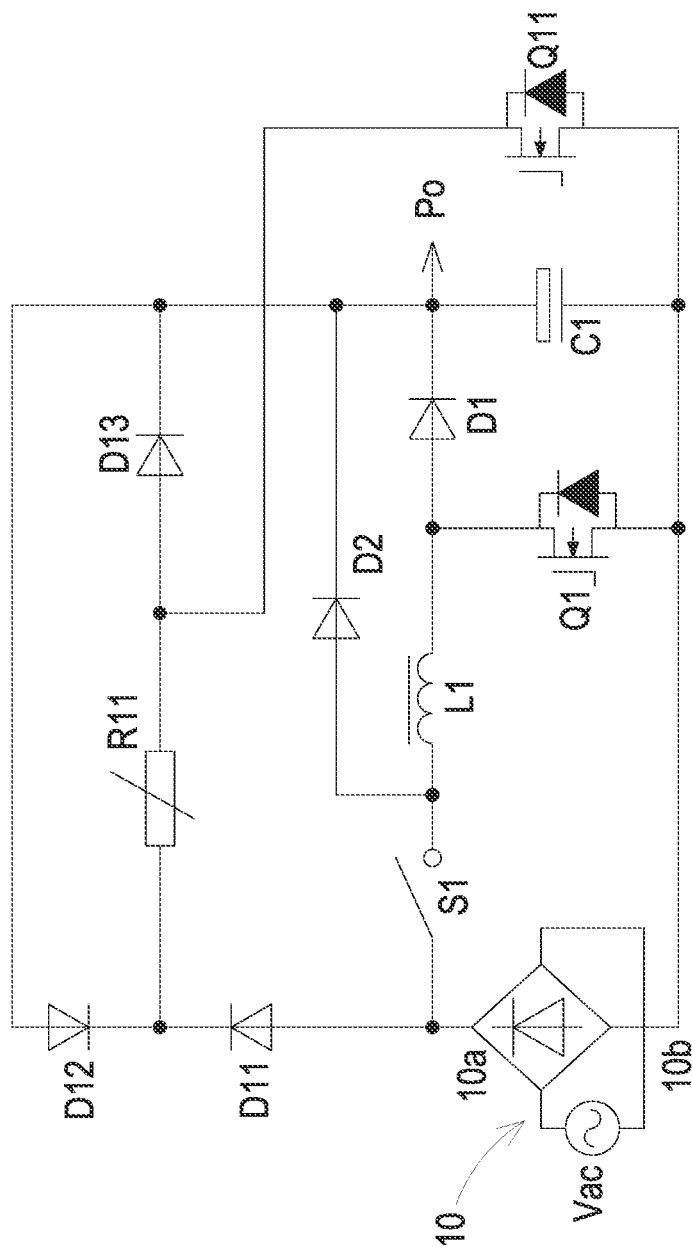
FIG. 1 is a schematic circuit diagram illustrating a power device with a protection circuit according to a first embodiment of the present disclosure.

FIG. 1 is a schematic circuit diagram illustrating a power device with a protection circuit according to a first embodiment of the present disclosure. As shown in FIG. 1, the power device 1 includes a power module 10, a power output terminal Po, a converter module, a bus capacitor C1, and a protection circuit. The power module 10 is adapted to receive an input power Vac, and the power module 10 includes a first terminal 10a and a second terminal 10b. The converter module includes an inductor L1, a boost diode D1, and a switch transistor Q1. A cathode of the boost diode D1 is electrically connected to the power output terminal Po, and an anode of the boost diode D1 is electrically connected to the inductor L1 and one terminal of the switch transistor Q1. The other terminal of the switch transistor Q1 is electrically connected to the second terminal 10b of the power module 10. The bus capacitor C1 is electrically connected between the second terminal 10b of the power module 10 and the power output terminal Po. The protection circuit includes a protection switch S1, a first diode D11, a second diode D12, a resistor R11, a third diode D13, and a switch transistor Q11. The protection switch S1 is electrically connected between the first terminal 10a of the power module 10 and the converter module. An anode of the first diode D11 is electrically connected to the first terminal 10a of the power module 10, and a cathode of the first diode D11 is electrically connected to a cathode of the second diode D12 and one terminal of the resistor R11. An anode of the second diode D12 is electrically connected to a cathode of the third diode D13 and the power output terminal Po. An anode of the third diode D13 is electrically connected to the other terminal of the resistor R11 and one terminal of the switch transistor Q11, and the other terminal of the switch transistor Q11 is electrically connected to the second terminal 10b of the power module 10.

The input power Vac is determined to be within the normal range when the input power Vac is lower than a default value. Under this circumstance, when the circuit is booted up, the protection switch S1 is turned off to utilize the resistor R11 to suppress the surge current generated from booting up. After the surge current is gone, the protection switch S1 is turned on for allowing the converter module to operate normally.

On the contrary, the input power Vac is determined to be overvoltage when the input power Vac is higher than the default value. Under this circumstance, the protection circuit may operate in two work modes alternatively. Firstly, it takes a certain time to detect the input power Vac, and there is a delay while turning off the protection switch S1. Accordingly, when the overvoltage of the input power Vac is detected and the protection switch S1 is turned off, the bus capacitor C1 is already in an overvoltage state (i.e., the voltage on the bus capacitor C1 is higher than a first default value). Consequently, the protection circuit operates in a first work mode. In the first work mode, the switch transistor Q11 is turned on for allowing the second diode D12, the resistor R11, the switch transistor Q11, and the bus capacitor C1 to form a discharging circuit. The bus capacitor C1 is discharged by the discharging circuit, thus the voltage on the bus capacitor C1 is decreased. After discharging for a period of time, the protection circuit operates in a second work mode if the voltage on the bus capacitor C1 is decreased to be lower than a second default value. In the second work mode, the switch transistor Q11 is turned off for allowing the power module 10, the first diode D11, the resistor R11, the third diode D13, and the bus capacitor C1 to form a charging circuit. Therefore, the bus capacitor C1 is charged by the input power Vac through the charging circuit, and the voltage on the bus capacitor C1 is increased. When the voltage on the bus capacitor C1 is increased to be higher than the first default value, which makes the bus capacitor C1 in the overvoltage state, the protection circuit is switched to operate in the first work mode again. By repeating the above operations, the overvoltage protection for the input power Vac is realized, and the voltage on the bus capacitor C1 may be controlled and regulated continuously at the same time.

Therefore, the power device 1 with the protection circuit can realize the suppression for the surge current and the overvoltage protection with fewer power components. The wiring complexity and the cost of the power device 1 may be reduced, and the power density of the power device 1 may be increased. Further, the voltage on the bus capacitor C1 may be controlled and regulated continuously during operating the overvoltage protection.

Figure 2:
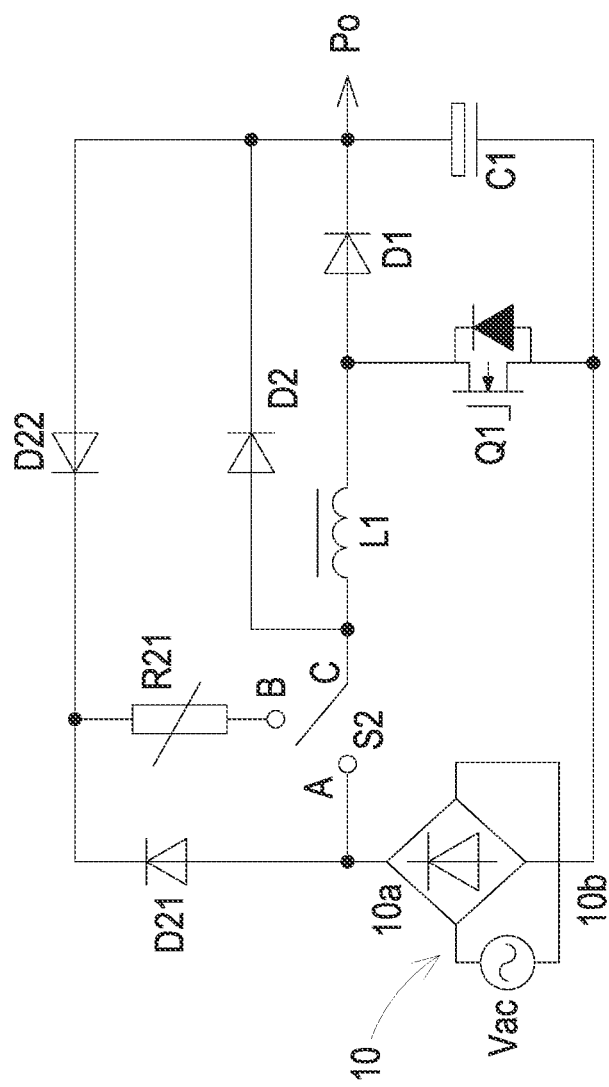
FIG. 2 is a schematic circuit diagram illustrating a power device with a protection circuit according to a second embodiment of the present disclosure.

FIG. 2 is a schematic circuit diagram illustrating a power device with a protection circuit according to a second embodiment of the present disclosure. As shown in FIG. 2, the power device 2 includes a power module 10, a power output terminal Po, a converter module, a bus capacitor C1, and a protection circuit. The power module 10 is configured to receive the input power Vac, and the power module 10 includes a first terminal 10a and a second terminal 10b. In the second embodiment, the components in the converter module and the connection relations thereof are approximately substantially the same as those in the first embodiment as shown in FIG. 1, thus the detailed description thereof is omitted herein. The bus capacitor C1 is electrically connected between the second terminal 10b of the power module 10 and the power output terminal Po. The protection circuit includes a protection switch S2, a first diode D21, a second diode D22, and a resistor R21. The protection switch S2 includes a common node C, a first contact node A, and a second contact node B. An anode of the first diode D21 is electrically connected to the first terminal 10a of the power module 10 and the first contact node A of the protection switch S2. A cathode of the first diode D21 is electrically connected to a cathode of the second diode D22 and one terminal of the resistor R21, and the other terminal of the resistor R21 is electrically connected to the second contact node B of the protection switch S2. The common node C of the protection switch S2 is electrically connected to the inductor L1 of the converter module. An anode of the second diode D22 is electrically connected to the power output terminal Po.

The input power Vac is determined to be within the normal range when the input power Vac is lower than a default value. Under this circumstance, when the circuit is first booted up, the common node C of the protection switch S2 is connected to the second contact node B to utilize the resistor R21 to suppress the surge current generated from booting up. After the surge current is gone, the common node C of the protection switch S2 is connected to the first contact node A for allowing the converter module to operate normally.

On the contrary, the input power Vac is determined to be overvoltage when the input voltage Vac is higher than the default value. Under this circumstance, the protection circuit may operate in two work modes alternatively. Firstly, it takes a certain time to detect the input power Vac, and there is a delay while controlling the protection switch S2. Accordingly, when the overvoltage of the input power Vac is detected and the common node C of the protection switch S2 is connected to the second contact node B, the bus capacitor C1 is already in an overvoltage state (i.e., the voltage on the bus capacitor C1 is higher than a first default value). Consequently, the protection circuit operates in a first work mode. In the first work mode, the switch transistor Q1 is turned on for allowing the second diode D22, the resistor R21, the inductor L1, the switch transistor Q1, and the bus capacitor C1 to form a discharging circuit. The bus capacitor C1 is discharged by the discharging circuit, thus the voltage on the bus capacitor C1 is decreased. After discharging for a period of time, if the voltage on the bus capacitor C1 is decreased to be lower than a second default value, the protection circuit operates in a second work mode. In the second work mode, the switch transistor Q1 is turned off for allowing the power module 10, the first diode D21, the resistor R21, the inductor L1, the boost diode D1, and the bus capacitor C1 to form a charging circuit. Therefore, the bus capacitor C1 is charged by the input power Vac through the charging circuit, and the voltage on the bus capacitor C1 is increased. When the voltage on the bus capacitor C1 is increased to be higher than the first default value, which makes the bus capacitor C1 in the overvoltage state, the protection circuit is switched to operate in the first work mode again. By repeating the above operations, the overvoltage protection for the input power Vac may be realized, and the voltage on the bus capacitor C1 may be controlled and regulated continuously at the same time.

Therefore, the power device 2 with the protection circuit may realize the suppression for the surge current and the overvoltage protection with fewer power components. The wiring complexity and cost of the power device 2 may be reduced, and the power density of the power device 2 may be increased. Further, the voltage on the bus capacitor C1 may be controlled and regulated continuously during operating the overvoltage protection.

Figure 3:
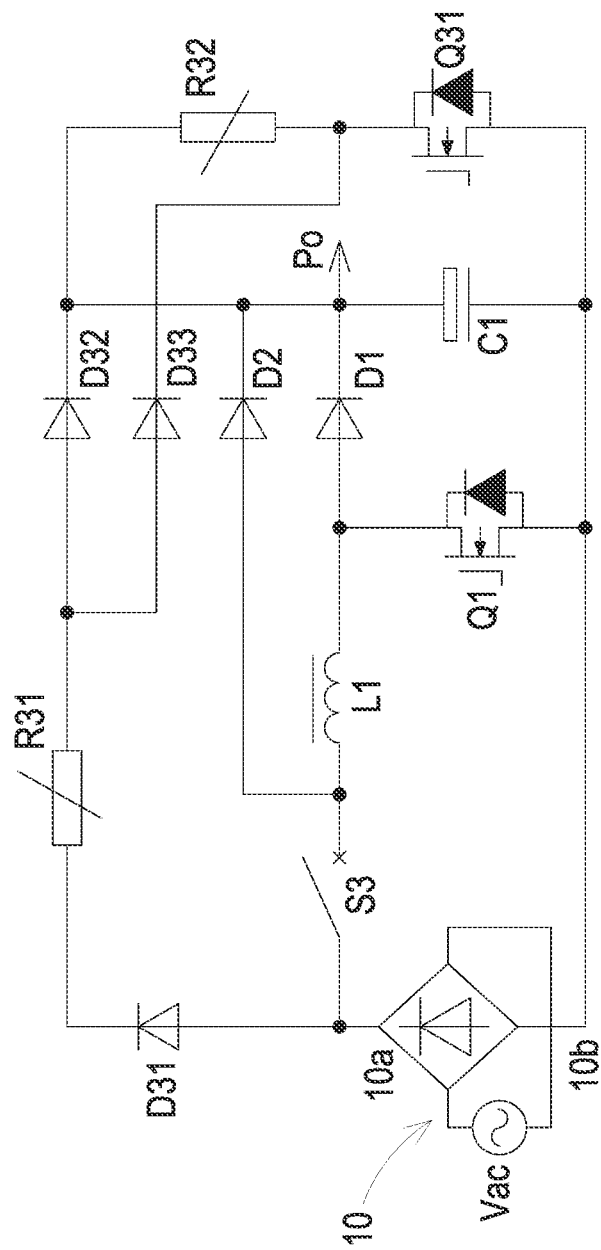
FIG. 3 is a schematic circuit diagram illustrating a power device with a protection circuit according to a third embodiment of the present disclosure.

FIG. 3 is a schematic circuit diagram illustrating a power device with a protection circuit according to a third embodiment of the present disclosure. As shown in FIG. 3, the power device 3 includes a power module 10, a power output terminal Po, a converter module, a bus capacitor C1, and a protection circuit. The power module 10 is adapted to receive the input power Vac, and the power module 10 has a first terminal 10a and a second terminal 10b. In the third embodiment, the components in the converter module and the connection relations thereof are approximately substantially the same as those in the first embodiment as shown in FIG. 1, thus the detailed description thereof is omitted herein. The bus capacitor C1 is electrically connected between the second terminal 10b of the power module 10 and the power output terminal Po. The protection circuit includes a protection switch S3, a first diode D31, a first resistor R31, a second diode D32, a third diode D33, a second resistor R32, and a switch transistor Q31. The protection switch S3 is electrically connected between the first terminal 10a of the power module 10 and the converter module. An anode of the first diode D31 is electrically connected to the first terminal 10a of the power module 10, and a cathode of the first diode D31 is electrically connected to one terminal of the first resistor R31. The other terminal of the first resistor R31 is electrically connected to an anode of the second diode D32 and an anode of the third diode D33. One terminal of the second resistor R32 is electrically connected to a cathode of the second diode D32, and the other terminal of the second resistor R32 is electrically connected to a cathode of the third diode D33 and one terminal of the switch transistor Q31. The other terminal of the switch transistor Q31 is electrically connected to the second terminal 10b of the power module 10.

In some embodiments, it may be chosen to dispose the first diode D31 or/and the third diode D33. In one embodiment, when the first diode D31 is disposed, the branch circuit in which the third diode D33 is located may be replaced with conducting wires. In another embodiment, when the third diode D33 is disposed, the branch circuit in which the first diode D31 is located may be replaced with conducting wires, or both the first diode D31 and the third diode D33 may be disposed as shown in FIG. 3. All these embodiments may realize the suppression for the surge current and the overvoltage protection according to the control manners described as follows, and the technical effects such as reducing the wiring complexity and the cost and increasing the power density may be achieved as well.

The input power Vac is determined to be within the normal range when the input power Vac is lower than a default value. Under this circumstance, when the circuit is booted up, the protection switch S3 is turned off to utilize the first resistor R31 to suppress the surge current generated from booting up. After the surge current is gone, the protection switch S3 is turned on for allowing the converter module to operate normally.

On the contrary, the input power Vac is determined to be overvoltage when the input power Vac is higher than the default value. Under this circumstance, the protection circuit operates in two work modes alternatively. Firstly, it takes a certain time to detect the input power Vac, and there is a delay while turning off the protection switch S3. Accordingly, when the overvoltage of the input power Vac is detected and the protection switch S3 is turned off, the bus capacitor C1 is already in an overvoltage state (i.e., the voltage on the bus capacitor C1 is higher than a first default value). Consequently, the protection circuit operates in a first work mode. In the first work mode, the switch transistor Q31 is turned on for allowing the second resistor R32, the switch transistor Q31, and the bus capacitor C1 to form a discharging circuit. The bus capacitor C1 is discharged by the discharging circuit, thus the voltage on the bus capacitor C1 is decreased. After discharging for a period of time, if the voltage on the bus capacitor C1 is decreased to be lower than a second default value, the protection circuit operates in a second work mode. In the second work mode, the switch transistor Q31 is turned off for allowing the power module 10, the first diode D31, the first resistor R31, the second diode D32, and the bus capacitor C1 to form a charging circuit. Therefore, the bus capacitor C1 is charged by the input power Vac through the charging circuit, and the voltage on the bus capacitor C1 is increased. When the voltage on the bus capacitor C1 is increased to be higher than the first default value, which makes the bus capacitor C1 in the overvoltage state, the protection circuit is switched to operate in the first work mode again. By repeating the above operations, the overvoltage protection for the input power Vac is realized, and the voltage on the bus capacitor C1 may be controlled and regulated continuously at the same time.

Therefore, the power device 3 with the protection circuit may realize the suppression for the surge current and the overvoltage protection with fewer power components. The wiring complexity and the cost of the power device 3 may be reduced, and the power density of the power device 3 may be increased. Further, the voltage on the bus capacitor C1 may be controlled and regulated continuously during operating the overvoltage protection.

Figure 4:
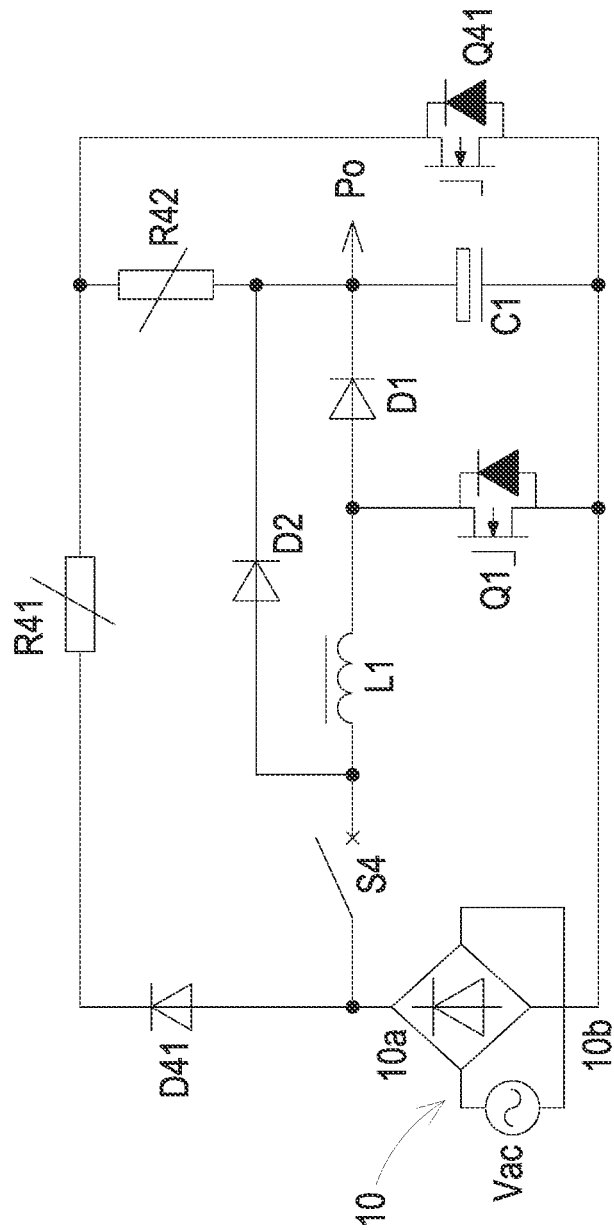
FIG. 4 is a schematic circuit diagram illustrating a power device with a protection circuit according to a fourth embodiment of the present disclosure.

FIG. 4 is a schematic circuit diagram illustrating a power device with a protection circuit according to a fourth embodiment of the present disclosure. As shown in FIG. 4, the power device 4 includes a power module 10, a power output terminal Po, a converter module, a bus capacitor C1, and a protection circuit. The power module 10 is adapted to receive the input power Vac, and the power module 10 includes a first terminal 10a and a second terminal 10b. In the fourth embodiment, the components in the converter module and the connection relations thereof are approximately substantially the same as those in the first embodiment as shown in FIG. 1, thus the detailed description thereof is omitted herein. The bus capacitor C1 is electrically connected between the second terminal 10b of the power module 10 and the power output terminal Po. The protection circuit includes a protection switch S4, a first diode D41, a first resistor R41, a second resistor R42, and a switch transistor Q41. The protection switch S4 is electrically connected between the first terminal 10a of the power module 10 and the converter module. An anode of the first diode D41 is electrically connected to the first terminal 10a of the power module 10, and a cathode of the first diode D41 is electrically connected to one terminal of the first resistor R41. The other terminal of the first resistor R41 is electrically connected to one terminal of the second resistor R42 and one terminal of the switch transistor Q41. The other terminal of the second resistor R42 is electrically connected to the power output terminal Po, and the other terminal of the switch transistor Q41 is electrically connected to the second terminal 10b of the power module 10.

The input power Vac is determined to be within the normal range when the input power Vac is lower than a default value. Under this circumstance, when the circuit is booted up, the protection switch S4 is turned off to utilize the first resistor R41 and the second resistor R42 to suppress the surge current generated from booting up. After the surge current is gone, the protection switch S4 is turned on for allowing the converter module to operate normally.

On the contrary, the input power Vac is determined to be overvoltage when the input power Vac is higher than the default value. Under this circumstance, the protection circuit operates in two work modes alternatively. Firstly, it takes a certain time to detect the input power Vac, and there is a delay while turning off the protection switch S4. Accordingly, when the overvoltage of the input power Vac is detected and the protection switch S4 is turned off, the bus capacitor C1 is already in an overvoltage state (i.e., the voltage on the bus capacitor C1 is higher than a first default value). Consequently, the protection circuit operates in a first work mode. In the first work mode, the switch transistor Q41 is turned on for allowing the second resistor R42, the switch transistor Q41, and the bus capacitor C1 to form a discharging circuit. The bus capacitor C1 is discharged by the discharging circuit, thus the voltage on the bus capacitor C1 is decreased. After discharging for a period of time, if the voltage on the bus capacitor C1 is decreased to be lower than a second default value, the protection circuit operates in a second work mode. In the second work mode, the switch transistor Q41 is turned off for allowing the power module 10, the first diode D41, the first resistor R41, the second resistor R42, and the bus capacitor C1 to form a charging circuit. Therefore, the bus capacitor C1 is charged by the input power Vac through the charging circuit, and the voltage on the bus capacitor C1 is increased. When the voltage on the bus capacitor C1 is increased to be higher than the first default value, which makes the bus capacitor C1 in the overvoltage state, the protection circuit is switched to operate in the first work mode again. By repeating the above operations, the overvoltage protection for the input power Vac is realized, and the voltage on the bus capacitor C1 may be controlled and regulated continuously at the same time.

Therefore, the power device 4 with the protection circuit may realize the suppression for the surge current and the overvoltage protection with fewer power components. The wiring complexity and the cost of the power device 4 are reduced, and the power density of the power device 4 is increased. Further, the voltage on the bus capacitor C1 may be controlled and regulated continuously during operating the overvoltage protection.

In an embodiment, the converter module further includes a diode D2. An anode of the diode D2 is electrically connected to the inductor L1, and a cathode of the diode D2 is electrically connected to a cathode of the boost diode D1.

In the above embodiments, the resistors (R11, R21, R31, R32, R41, R42) may be preferably positive temperature coefficient (PTC) thermistors, but not limited thereto. In an embodiment, the speeds of the charging and discharging circuits charging and discharging the bus capacitor C1 may be regulated through varying the resistance values of the resistors (R11, R21, R31, R32, R41, R42).

In some embodiments, when the voltage on the bus capacitor C1 is higher than a first default value, the protection switch (S1, S2, S3, S4) is turned off, the switch transistor (Q1, Q11, Q31, Q41) is turned on, and the second diode (D12, D22, D32), the resistor (R11, R21, R31, R32, R41, R42), the switch transistor (Q1, Q11, Q31, Q41), and the bus capacitor C1 form a discharging circuit to decrease the voltage on the bus capacitor C1. A variation rate of the voltage on the bus capacitor C1 is changed based on a variation of a resistance value of the discharging circuit. When the resistance value of the discharging circuit is increased, the variation rate of the voltage on the bus capacitor C1 is decreased. When the resistance value of the discharging circuit is decreased, the variation rate of the voltage on the bus capacitor C1 is increased. In an embodiment, a discharging rate of the bus capacitor C1 is changed based on a resistance value of the discharging circuit.

In some embodiments, when a voltage on the bus capacitor C1 is lower than a second default value, the protection switch (S1, S2, S3, S4) is turned off, the switch transistor (Q1, Q11, Q31, Q41) is turned off, and the power module, the first diode (D11, D21, D31, D41), the resistor (R11, R21, R31, R32, R41, R42), the third diode (D13, D33), and the bus capacitor C1 form a charging circuit to increase the voltage on the bus capacitor. A variation rate of the voltage on the bus capacitor C1 is changed based on a variation of a resistance value of the charging circuit. When the resistance value of the discharging circuit is increased, the variation rate of the voltage on the bus capacitor C1 is decreased. When the resistance value of the discharging circuit is decreased, the variation rate of the voltage on the bus capacitor C1 is increased. In an embodiment, a charging rate of the bus capacitor C1 is changed based on a resistance value of the charging circuit.

Figure 5:
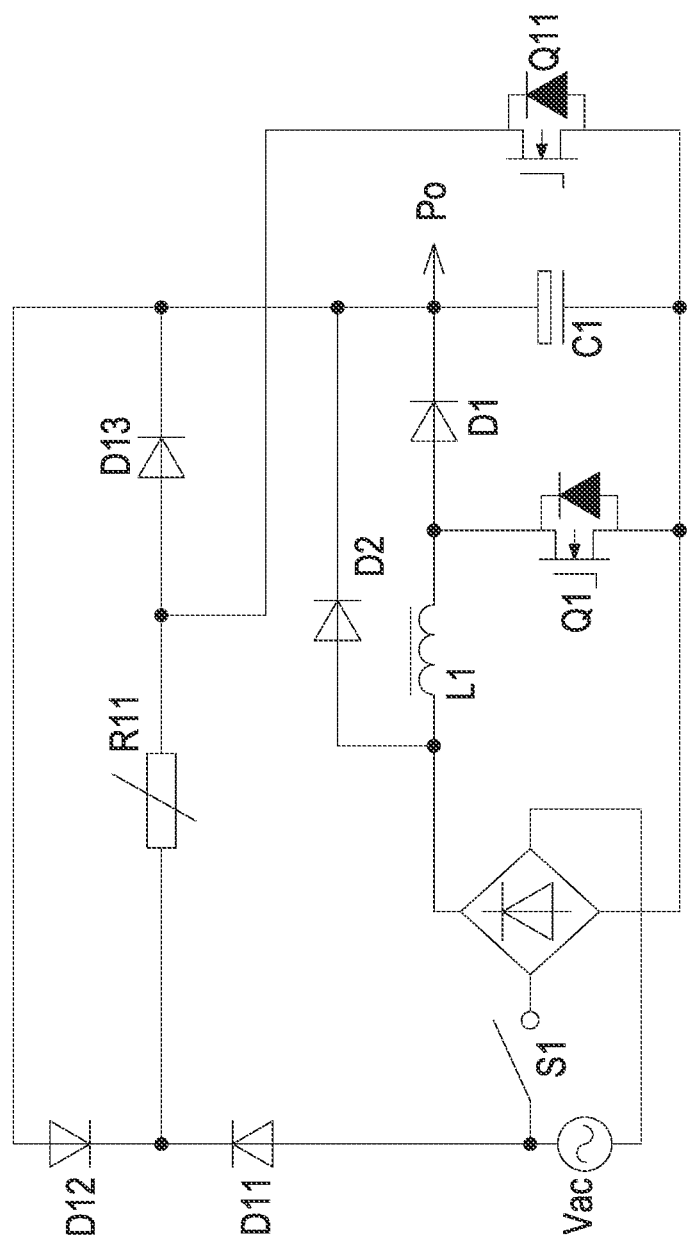
FIG. 5, FIG. 6 and FIG. 7 schematically show variations of the power device of FIG. 1.

In some embodiments, the first diodes D11, D21, D31, and D41 may also be connected to the input power Vac. Specifically, the anodes of the first diodes D11, D21, D31, and D41 are connected to one terminal of the input power Vac, and the protection switches S1, S2, S3, and S4 are connected between the anodes of the first diodes and the rectifier circuits correspondingly. FIG. 5 shows the specific variation of the circuit of the first embodiment of FIG. 1. Certainly, in other embodiments shown in FIGS. 2-4, the positions of the first diode and protection switch may be modified similarly through adaptively adjusting the circuit structure. The specific way of modification may be realized by the person skilled in the art, thus the detailed description thereof is omitted herein.

In an embodiment, the way of controlling the voltage on the bus capacitor C1 is not limited to that described in the above embodiments. For example, a loop compensation (e.g., proportional integral part) may be further added to the detection and controlling loop for further stabilizing the voltage on the bus capacitor C1. The loop compensation may be realized by the person skilled in the art, thus the detailed description thereof is omitted herein.

Figure 6:
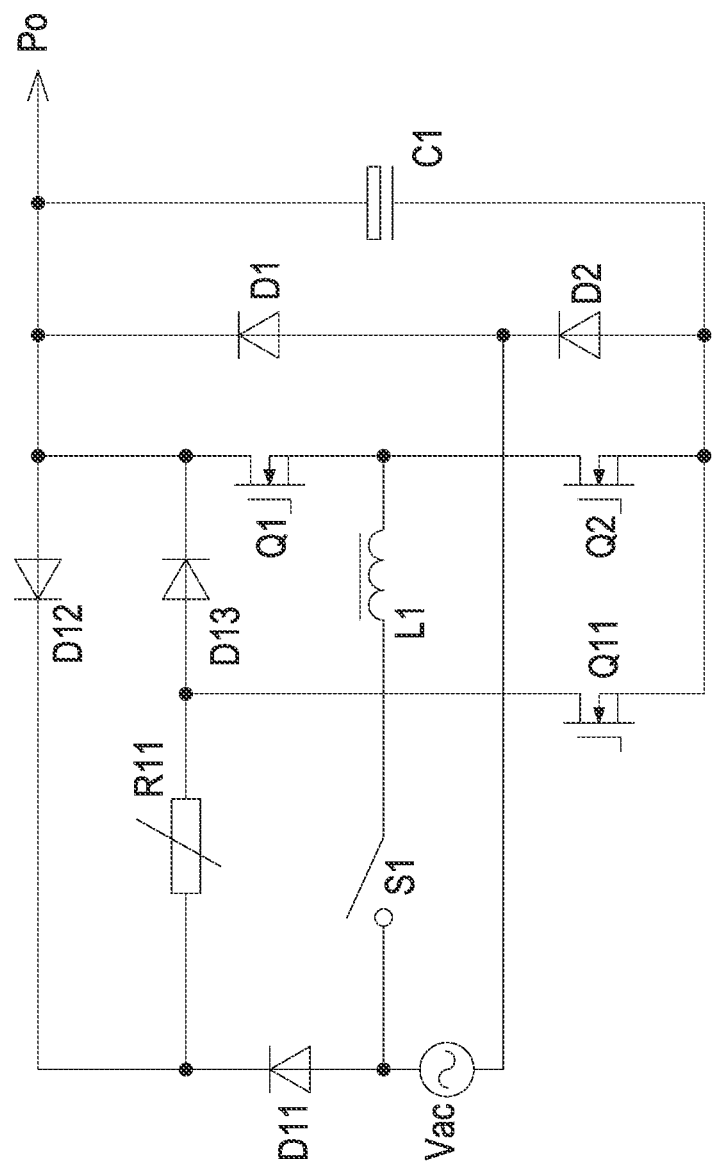
Figure 7:
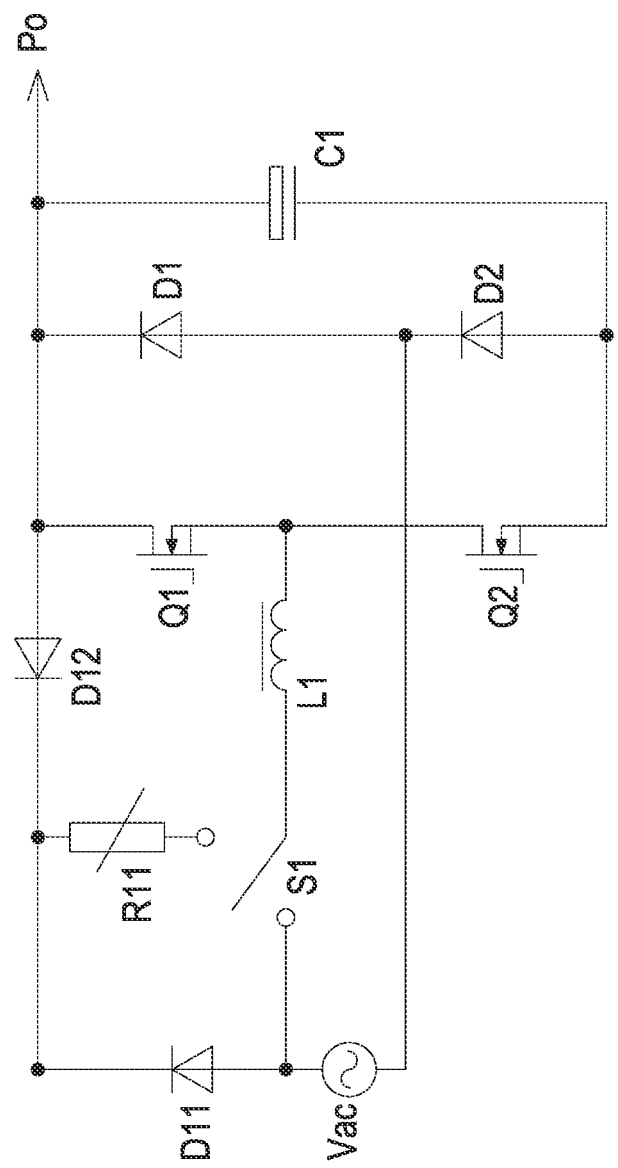

In some embodiments, the converter module may be implemented by other circuit topologies, such as the bridgeless PFC circuits shown in FIG. 6 and FIG. 7, the interleaved boost topology or the conventional buck circuit, etc. FIGS. 6 and 7 just exemplify the variation of the protection circuit of the first embodiment of the present disclosure. For the other embodiments shown in FIGS. 2-4, the implementation of the converter module may also be varied. With regard to the corresponding protection circuit, it is just needed to adaptively adjust the connection relations of the components in the protection circuit. The specific way of modification may be realized by the person skilled in the art, thus the detailed description thereof is omitted herein.

From the above descriptions, the present disclosure provides a power device with a protection circuit. The power device with the protection circuit may realize the suppression for the surge current and the overvoltage protection with fewer power components. The wiring complexity and the cost are reduced, and the power density of the power device is increased. Further, the voltage on the bus capacitor may be controlled and regulated continuously during operating the overvoltage protection, and the electric power is provided to the auxiliary power terminal by the bus capacitor.

While the disclosure has been described in terms of what is presently considered to be the most practical and preferred embodiments, it is to be understood that the disclosure needs not be limited to the disclosed embodiment.

What is claimed is:

1. A power device, comprising:
   a power module configured to receive an input power and comprising a first terminal and a second terminal;
   a power output terminal;
   a converter module electrically connected between the power module and the power output terminal;
   a bus capacitor electrically connected between the second terminal of the power module and the power output terminal; and
   a protection circuit comprising a protection switch, a first diode, a second diode, a resistor, a third diode, and a switch transistor, wherein the protection switch is electrically connected between the first terminal of the power module and the converter module, an anode of the first diode is electrically connected to the first terminal of the power module, a cathode of the first diode is electrically connected to a cathode of the second diode and one terminal of the resistor, an anode of the second diode is electrically connected to a cathode of the third diode and the power output terminal, an anode of the third diode is electrically connected to the other terminal of the resistor and one terminal of the switch transistor, and the other terminal of the switch transistor is electrically connected to the second terminal of the power module.

2. The power device according to claim 1, wherein when a voltage on the bus capacitor is higher than a first default value, the protection switch is turned off, the switch transistor is turned on, and the second diode, the resistor, the switch transistor, and the bus capacitor form a discharging circuit to decrease the voltage on the bus capacitor.

3. The power device according to claim 2, wherein a discharging rate of the bus capacitor is changed based on a resistance value of the discharging circuit.

4. The power device according to claim 1, wherein when a voltage on the bus capacitor is lower than a second default value, the protection switch is turned off, the switch transistor is turned off, and the power module, the first diode, the resistor, the third diode, and the bus capacitor form a charging circuit to increase the voltage on the bus capacitor.

5. The power device according to claim 4, wherein a charging rate of the bus capacitor is changed based on a resistance value of the charging circuit.

6. A power device, comprising:
   a power module configured to receive an input power and comprising a first terminal and a second terminal;
   a power output terminal;

a converter module comprising an inductor, a boost diode, and a switch transistor, wherein a cathode of the boost diode is electrically connected to the power output terminal, an anode of the boost diode is electrically connected to the inductor and one terminal of the switch transistor, and the other terminal of the switch transistor is electrically connected to the second terminal of the power module;

a bus capacitor electrically connected between the second terminal of the power module and the power output terminal; and a protection circuit comprising a protection switch, a first diode, a second diode, and a resistor, wherein the protection switch comprises a common node, a first contact node, and a second contact node, an anode of the first diode is electrically connected to the first terminal of the power module and the first contact node of the protection switch, a cathode of the first diode is electrically connected to a cathode of the second diode and one terminal of the resistor, the other terminal of the resistor is electrically connected to the second contact node of the protection switch, the common node of the protection switch is electrically connected to the inductor of the converter module, and an anode of the second diode is electrically connected to the power output terminal.

7. The power device according to claim 6, wherein when a voltage on the bus capacitor is higher than a first default value, the common node of the protection switch is connected to the second contact node, the switch transistor is turned on, and the second diode, the resistor, the inductor, the switch transistor, and the bus capacitor form a discharging circuit to decrease the voltage on the bus capacitor.

8. The power device according to claim 7, wherein a discharging rate of the bus capacitor is changed based on a resistance value of the discharging circuit.

9. The power device according to claim 6, wherein when a voltage on the bus capacitor is lower than a second default value, the common node of the protection switch is connected to the second contact node, the switch transistor is turned off, and the power module, the first diode, the resistor, the inductor, the boost diode, and the bus capacitor form a charging circuit to increase the voltage on the bus capacitor.

10. The power device according to claim 9, wherein a charging rate of the bus capacitor is changed based on a resistance value of the charging circuit.

11. A power device, comprising:
a power module configured to receive an input power and comprising a first terminal and a second terminal;
a power output terminal;
a converter module electrically connected between the power module and the power output terminal;
a bus capacitor electrically connected between the second terminal of the power module and the power output terminal; and
a protection circuit comprising a protection switch, a first diode, a first resistor, a second diode, a third diode, a second resistor, and a switch transistor, wherein the protection switch is electrically connected between the first terminal of the power module and the converter module, an anode of the first diode is electrically connected to the first terminal of the power module, a cathode of the first diode is electrically connected to one terminal of the first resistor, the other terminal of the first resistor is electrically connected to an anode of the second diode and an anode of the third diode, one terminal of the second resistor is electrically connected to a cathode of the second diode, the other terminal of the second resistor is electrically connected to a cathode of the third diode and one terminal of the switch transistor, and the other terminal of the switch transistor is electrically connected to the second terminal of the power module.

12. The power device according to claim 11, wherein when a voltage on the bus capacitor is higher than a first default value, the protection switch is turned off, the switch transistor is turned on, and the second resistor, the switch transistor, and the bus capacitor form a discharging circuit to decrease the voltage on the bus capacitor.

13. The power device according to claim 12, wherein a discharging rate of the bus capacitor is changed based on a resistance value of the discharging circuit.

14. The power device according to claim 11, wherein when a voltage on the bus capacitor is lower than a second default value, the protection switch is turned off, the switch transistor is turned off, and the power module, the first diode, the first resistor, the second diode, and the bus capacitor form a charging circuit to increase the voltage on the bus capacitor.

15. The power device according to claim 14, wherein a charging rate of the bus capacitor is changed based on a resistance value of the charging circuit.

16. A power device, comprising:
a power module configured to receive an input power and comprising a first terminal and a second terminal;
a power output terminal;
a converter module electrically connected between the power module and the power output terminal;
a bus capacitor electrically connected between the second terminal of the power module and the power output terminal; and
a protection circuit comprising a protection switch, a first diode, a first resistor, a second resistor, and a switch transistor, wherein the protection switch is electrically connected between the first terminal of the power module and the converter module, an anode of the first diode is electrically connected to the first terminal of the power module, a cathode of the first diode is electrically connected to one terminal of the first resistor, the other terminal of the first resistor is electrically connected to one terminal of the second resistor and one terminal of the switch transistor, the other terminal of the second resistor is electrically connected to the power output terminal, and the other terminal of the switch transistor is electrically connected to the second terminal of the power module.

17. The power device according to claim 16, wherein when a voltage on the bus capacitor is higher than a first default value, the protection switch is turned off, the switch transistor is turned on, and the second resistor, the switch transistor, and the bus capacitor form a discharging circuit to decrease the voltage on the bus capacitor.

18. The power device according to claim 17, wherein a discharging rate of the bus capacitor is changed based on a resistance value of the discharging circuit.

19. The power device according to claim 16, wherein when a voltage on the bus capacitor is lower than a second default value, the protection switch is turned off, the switch transistor is turned off, and the power module, the first diode, the first resistor, the second resistor, and the bus capacitor form a charging circuit to increase the voltage on the bus capacitor.

20. The power device according to claim 19, wherein a charging rate of the bus capacitor is changed based on a resistance value of the charging circuit.

* * * * *